(12) United States Patent
Fujii et al.

(10) Patent No.: US 6,581,857 B2
(45) Date of Patent: Jun. 24, 2003

(54) EXTERNALLY PRESSURIZED GAS BEARING SPINDLE

(75) Inventors: Shoji Fujii, Shizuoka (JP); Yoshio Fujikawa, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/964,630

(22) Filed: Sep. 28, 2001

(65) Prior Publication Data

US 2002/0038827 A1 Apr. 4, 2002

(30) Foreign Application Priority Data

Sep. 29, 2000 (JP) ........................................ 2000-299984
Nov. 20, 2000 (JP) ........................................ 2000-353180

(51) Int. Cl.[7] ............................. B05B 5/00; F23D 11/32
(52) U.S. Cl. ........................................ 239/703; 239/690
(58) Field of Search ................................. 239/690, 700, 239/703; 384/107, 109, 110, 111, 113

(56) References Cited

U.S. PATENT DOCUMENTS

| 4,361,288 A | * | 11/1982 | Fukuda et al. | 239/703 |
| 4,369,924 A | * | 1/1983 | Morishita et al. | 239/703 |
| 4,384,682 A | * | 5/1983 | Sugiyama et al. | 239/703 |
| 4,467,968 A | * | 8/1984 | Morishita et al. | 239/703 |
| 5,288,525 A | * | 2/1994 | Diana | 427/475 |
| 5,474,236 A | * | 12/1995 | Davis et al. | 239/703 |
| 5,660,480 A | * | 8/1997 | Fujii et al. | 384/107 |
| 5,697,559 A | * | 12/1997 | Davis et al. | 239/703 |
| 5,749,529 A | * | 5/1998 | Kazama et al. | 239/690 |
| 6,053,437 A | * | 4/2000 | Hansinger et al. | 239/703 |

* cited by examiner

*Primary Examiner*—Charles G. Freay
*Assistant Examiner*—Han L. Liu
(74) *Attorney, Agent, or Firm*—Wenderoth, Lind & Ponack, L.L.P.

(57) ABSTRACT

A spindle for an electrostatic painting machine has a main spindle and a rotor coupled to the rear end of the main spindle. The main spindle and the rotor are rotatably supported through bearing gaps of externally pressurized gas bearing portions, and a paint spray head is mounted to one end of the main spindle. A current-carrying member having conductivity with the housing is brought into contact with the main spindle and floated off it via a small gap due to dynamic pressure produced by the rotation of the main spindle. With this arrangement, it is ensured that discharge occurs at gaps of externally pressurized gas bearing portions, sputtering is suppressed, and the life of the spindle is prolonged.

26 Claims, 10 Drawing Sheets

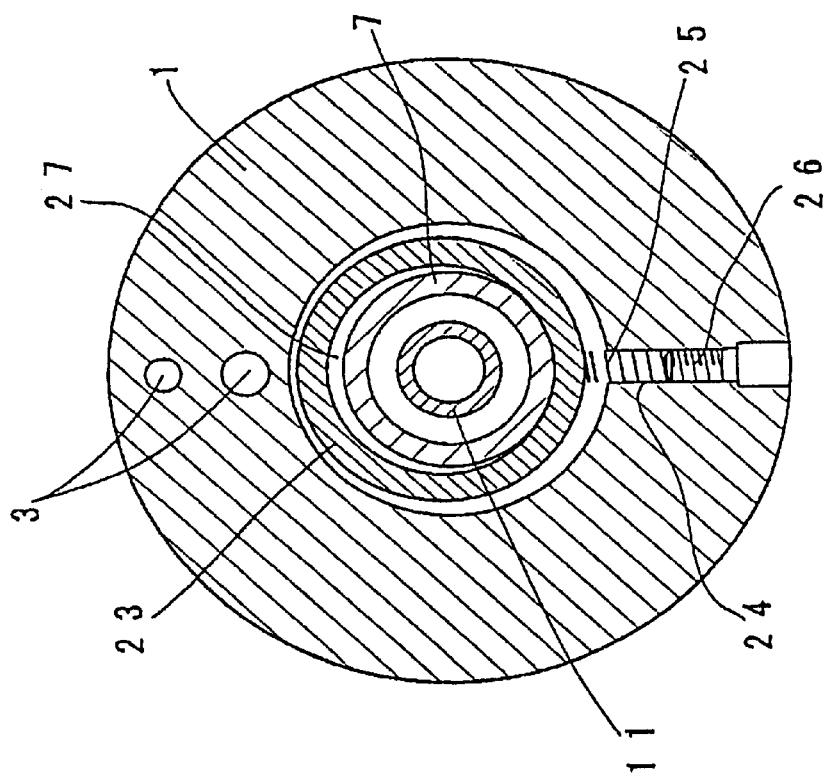
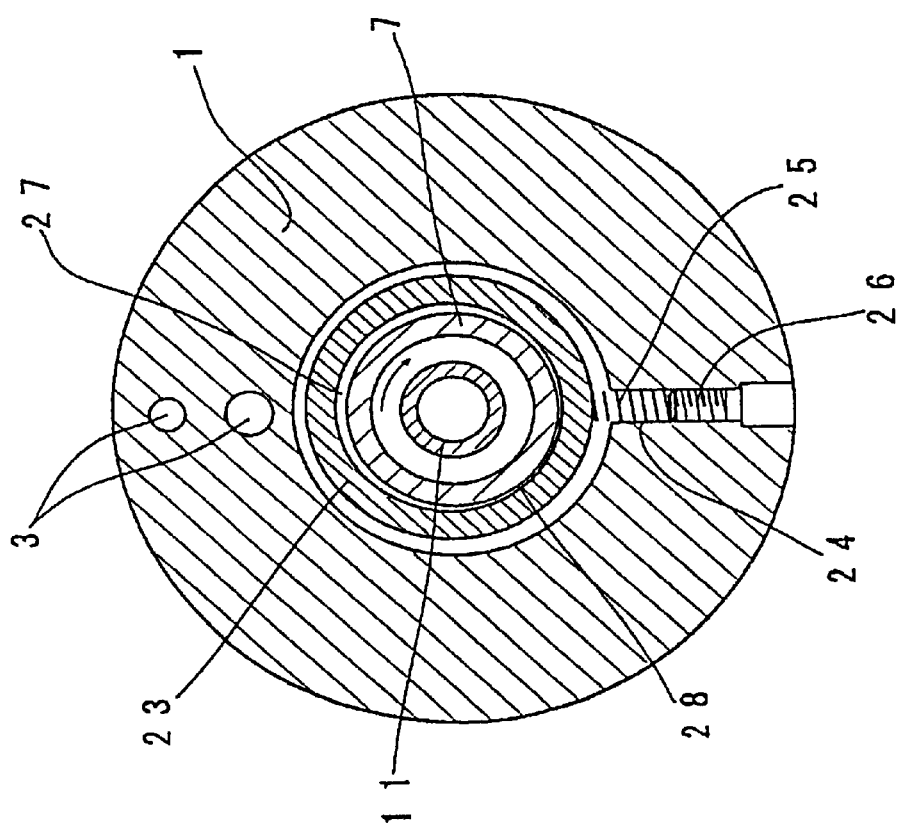

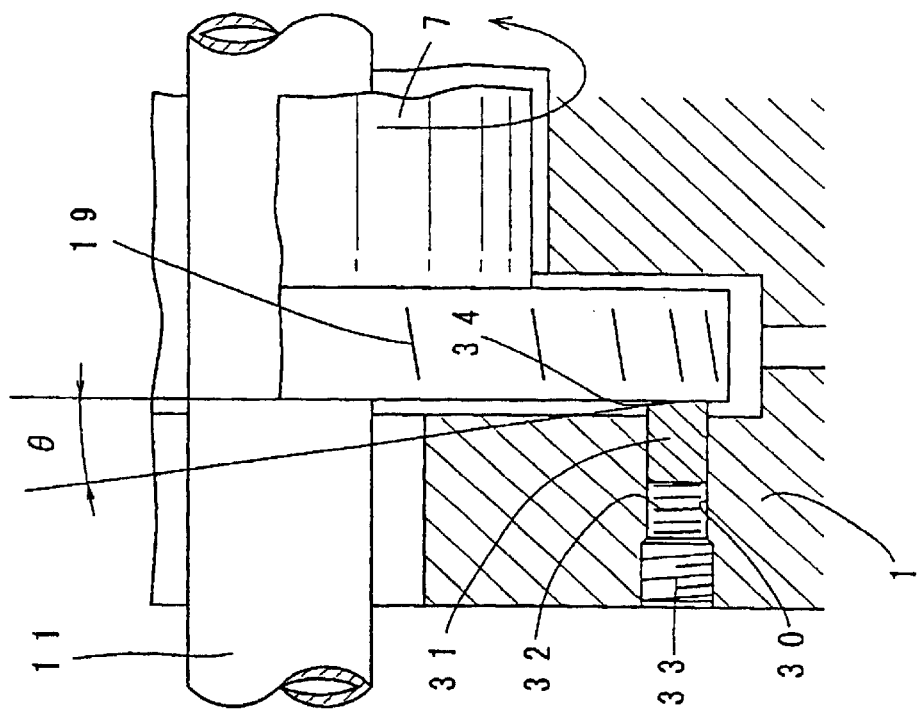
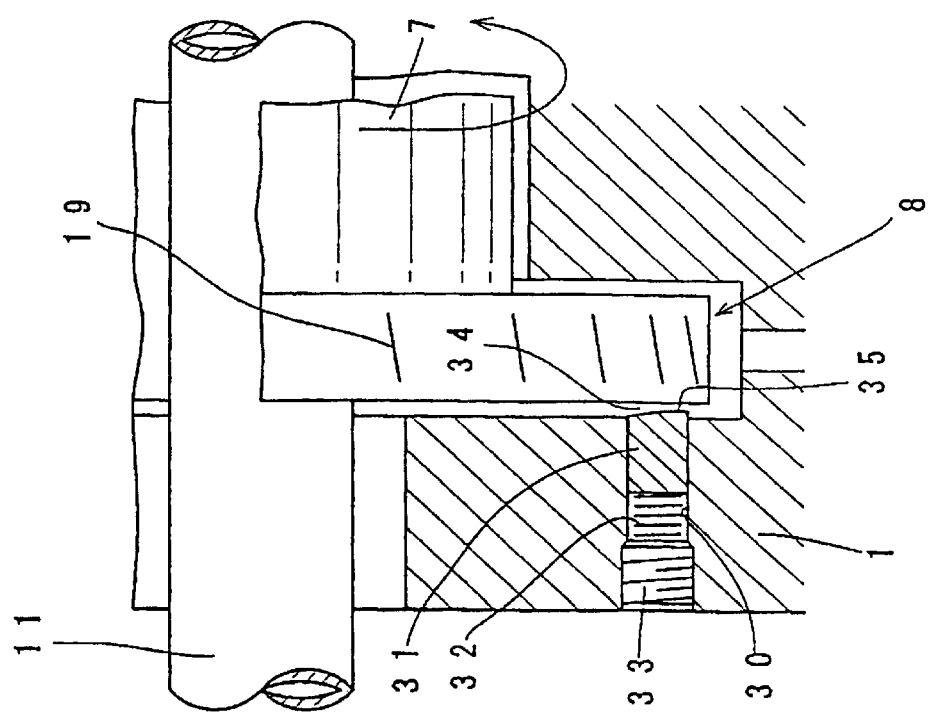

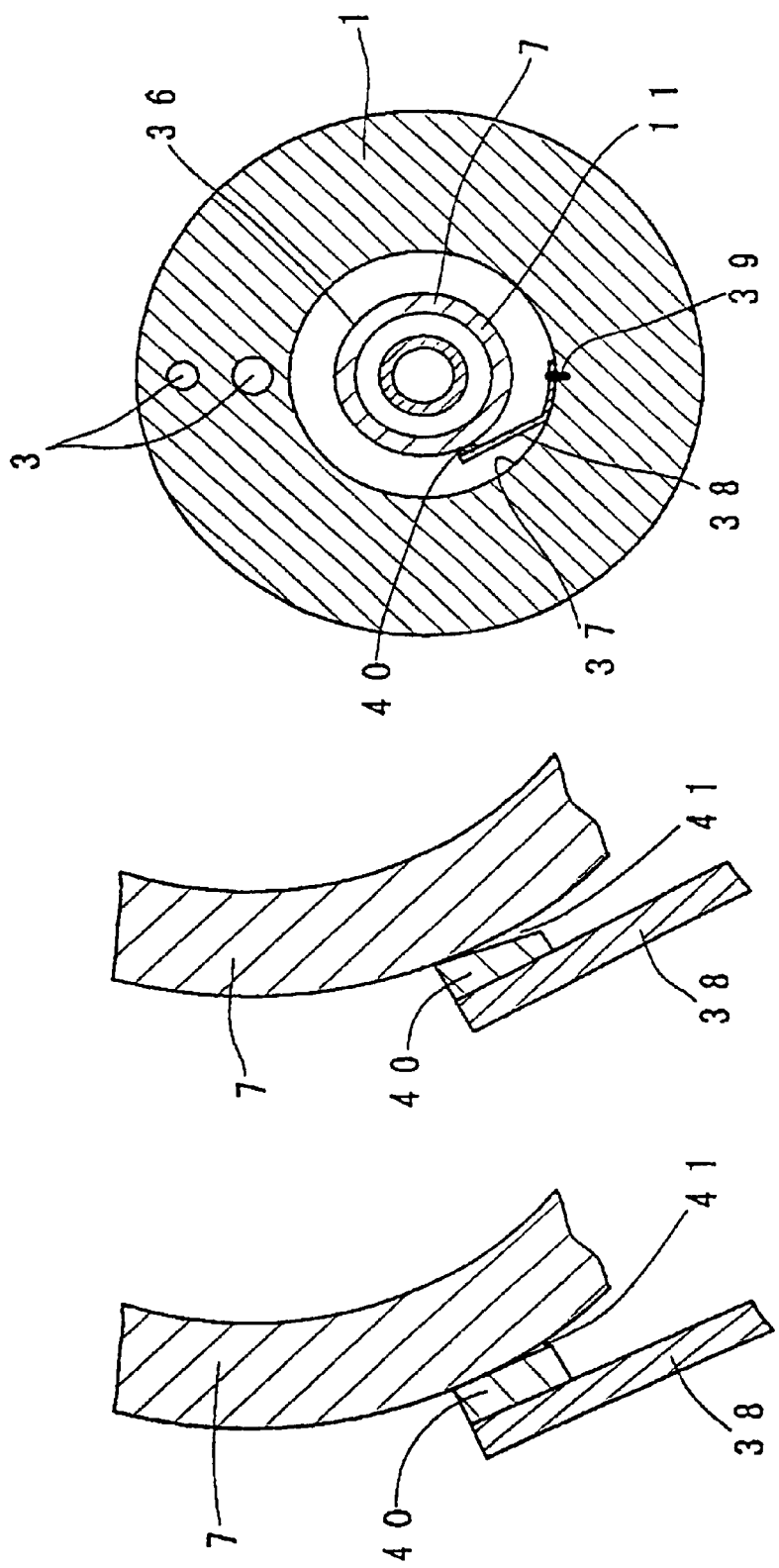

EXTERNALLY PRESSURIZED GAS BEARING SPINDLE

BACKGROUND OF THE INVENTION

This invention relates to an externally pressurized gas bearing spindle mounted in a rotary atomizing head type electrostatic painting machine to support a main spindle carrying a paint spray head in a non-contact manner by means of an externally pressurized gas bearing.

Heretofore, for painting of automotive parts, electric parts, etc., various kinds of electrostatic painting machines have been used in which paint is atomized and electrostatically charged with a negative charge to cause it to adhere to surfaces to be painted using electrical attraction.

With such an electrostatic painting machine, in order to obtain a uniform painted surface by reducing the particle diameter of the atomized paint as much as possible, it is required to rotate the atomizing head for paint at high speed. In order to cope with this requirement, a structure is usually employed in which a rotary shaft of a spindle on which is mounted the atomizing head is supported by an externally pressurized gas bearing in a non-contact manner.

FIG. 9 shows a first example of a conventional spindle for a rotary atomizing head type electrostatic painting machine. In this spindle, a high voltage generator 2 for generating a negative high voltage is electrically connected to a housing 1. Inside of the housing, an air passage 3 with an air inlet 3a connected to a compressed air supply source (not shown) is formed. In an internal hole 1a in the housing 1, a plurality of air supply nozzles 4, 5, 5' communicating with the air passage 3 are formed.

In the internal hole 1a in the housing 1, a main spindle 7 and a rotor 8 of a turning force generator (e.g. air turbine) provided at the rear end of the main spindle for rotating the main spindle 7 are inserted so as to form bearing gaps 6, 6'. Between the periphery of the main spindle 7 and the air supply nozzles 4, a journal air bearing portion 9 is formed. Between the rotor 8 and the air supply nozzles 5, 5', thrust air bearing portions 10, 10' are formed. When compressed air is supplied from the air supply nozzles 4, 5 and 5' into the bearing gap 6, 6', due to the pressure of the air, the main spindle 7 and the rotor 8 are supported in a floating state and out of contact with the housing 1, so that the externally pressurized gas bearing comprising the journal air bearing portion 9 and the thrust air bearing portion 10, 10' reveals its function.

At the front end of the main spindle 7, a paint atomizing head 13 for atomizing and spraying paint to the surroundings by the rotation of the main spindle 7 is fixed by suitable means such as screws. A conduit 11 having an injection nozzle 17 at its tip to feed paint to the spray head 13 is inserted into the main spindle 7 out of contact with the main spindle.

With this spray head 13, paint injected from the injection nozzle 17 into a paint introducing space 15 defined by a partitioning wall 16 passes through a flow-out hole 18 and is introduced to an inner peripheral surface 14 of the spray head 13 by high-speed rotation of the spray head 13, and scattered in a mist to the surroundings by centrifugal force. If the spray head 13 is in a negatively charged state, the paint flowing along the inner peripheral surface 14 is electrostatically charged with a negative charge.

Around the rotor 8 at the rear end of the main spindle 7, a plurality of turbine blades 19 are arranged. In the housing 1, compressed air blow-out nozzles 20 for blowing compressed air against the turbine blades 19 is formed. Also, a compressor 21 is coupled to the blow-out nozzle 20. With this structure, when compressed air is blown against the turbine blades 19 through the blow-out nozzle 20, turning force is given to the turbine blades 19. Thus, the main spindle 7, which is supported in a floating state, rotates at a high speed.

FIG. 10 shows a second example of a prior art spindle for an electrostatic painting machine using an air turbine as a driving means. It has a main spindle 7 and a rotor 8 provided at the rear end of the main spindle. The rotor 8 is formed with a plurality of recesses 19' in its outer periphery and a housing 1 is formed with an air blow-out nozzle 20 at a position opposite to the rotor 8. Compressed air is blown from the nozzle 20 to rotate the main spindle 7. A paint spray head (not shown) is mounted to the front end of the main spindle 7.

The main spindle 7 and the rotor 8 integral with the main spindle are rotatably supported in a non-contact manner by bearing sleeves 51, 52 and first and second housings 53, 54 by a journal bearing portion 9 and thrust bearing portions 10, 10' formed by the bearing sleeves 51, 52 and the first and second housings 53, 54.

The journal bearing portion 9 and the thrust bearing portion 10 are formed by mounting the bearing sleeve 51 in the first housing 53 by shrinkage fitting, press fitting or bonding. Similarly the thrust bearing portion 10' is formed by mounting the bearing sleeve 52 in the second housing 54 by shrinkage fitting, press fitting or bonding.

The bearing sleeves 51 and 52 are made of a copper alloy which is an ordinary air bearing material. They are formed with air supply nozzles 4, 4' for the journal bearing and air supply nozzles 5, 5' for the thrust bearing.

Between the first and second housings 53, 54 is mounted a third housing 55. The first to third housings 53–55 are secured together by bolts or the like. The first to third housings (forming the entire housing 1) are arranged in a painting machine casing 56 made of a resin through elastic members 57. The housing 1 is normally made of a light metal such as aluminum alloy for lighter weight.

The first and second housings 53, 54 are formed with annular grooves 58–60 which communicate with air supply nozzles 4, 4' and 5, 5' formed in the bearing sleeves 51, 52. Also, air passages 3, 3', 62, 61 communicating with these annular grooves 58–60 are formed in the housings 53, 54 and 55.

The air passage 63 communicating with an air supply port 3a is formed in the painting machine casing 56. Also, the third housing 55 is formed with the compressed air blow-out nozzles 20 opening opposite to the recesses 19' of the rotor 8 in a tangential direction.

Compressed air supplied from the air passage 63 in the painting machine casing 56 is supplied from the air supply port 3a of the first housing 53 through the annular groove 59 and the air passage 3 to the annular grooves 58, 59 and blown out to the bearing surface through the air supply nozzles 4, 4' of the bearing sleeve 51 so that the journal bearing portion 9 supports the main spindle 7 in a radial direction.

Also, compressed air is blown out through the annular groove 59 of the first housing 53 from the air supply nozzle 5 to the bearing surface of the thrust bearing portion 10'. The compressed air is also supplied through the air passages 3', 62 and 61 of the first, third and second housings 53, 55 and 54, respectively, to the annular groove 60 and blown from the air supply nozzle 5' to the bearing surface of the thrust bearing portion 10'. Thus the thrust bearing portions 10, 10' support the main spindle 7 in an axial direction.

On the other hand, compressed air supplied from an air passage 64 of the painting machine casing 56 is blown from the air blow-out nozzles 20 of the third housing 55 toward the recesses 19' of the rotor 8 of the main spindle 7 in a tangential direction. After applying a turning force to the main spindle 7, compressed air is discharged through an exhaust port (not shown) out of the housing 1. At one end (right-hand end in FIG. 10) of the main spindle 7, a paint spray head (not shown) is mounted to atomize paint for electrostatic painting.

With the structure of the first prior art spindle, though depending upon applied voltage, its polarity, current, bearing gap, material used, etc., a discharge phenomenon sometimes occurs in the bearing gap 6, so that sputtering occurs. If sputtering occurs, atoms forming the housing 1 or the main spindle 7 with the bearing gap 6 therebetween will jump out, thus changing the bearing gap 6, so that the support state of the main spindle 7 becomes unstable. This may cause the main spindle 7 to come into contact with the housing 1.

An object of this invention is to provide a spindle for an electrostatic painting machine having improved bearing endurance by preventing occurrence of sputtering at bearing gaps without being affected by such conditions as the applied voltage, polarity, current, bearing gaps, etc.

In the second example of the prior art spindle shown in FIG. 10, the housing 1 is ordinarily formed of a light metal such as aluminum alloy for lighter weight and the bearing sleeves 51 and 52 are ordinarily formed of a copper alloy. In such a case, since copper alloy has a larger density than aluminum alloy, the volume ratio of the housing 1 to the bearing sleeves 51 and 52 is ordinarily set so as to reduce the weight of the entire housing assembly.

On the other hand, in recent years, in electrostatic painting, change from an organic solvent paint to a water-soluble paint is advancing in view of environmental problems. But, if a water-soluble paint is used, the housing made of an aluminum alloy could corrode. One solution to this problem is to make the housing of stainless steel. But this change without changing the volume ratio of the housing to the bearing sleeves would increase the weight of the entire housing assembly substantially.

Also, the requirement for higher speed of the main spindle is increasing to provide for higher painting performance. Because a water-soluble paint has a higher viscosity than an organic-solvent paint, the requirement for higher speed of the spindle is accordingly high. With higher speed of the spindle, increased endurance of the bearing portion is required. In this connection, as a material which is less susceptible to damage due to contact with the bearing portion during high speed rotation, there is graphite, which has excellent self-lubricity and has in recent years been used as an air bearing material.

However, if the bearing sleeves 51, 52 are formed of graphite, anode corrosion could occur at the bonding surface with the housing made of an aluminum alloy. This problem is particularly serious if a water-soluble paint is used. Thus it is difficult to use the bearing sleeves made of graphite and the housing made of an aluminum alloy in contact with each other.

It is conceivable to form the housing and the bearing sleeves integral and make the united member of graphite. But graphite has a small elastic coefficient, is susceptible to deformation upon chucking during machining and, when used for the bearing sleeves, makes it difficult to machine the bearing surface with high accuracy. Also, with an electrostatic painting machine, the spindle has to be mounted on and removed from the painting machine during maintenance work. If the housing is made of graphite, it is liable to get marred or chipped during mounting and removal.

Another object of this invention is to provide a spindle which has improved corrosion resistance and bearing endurance during high speed rotation.

SUMMARY OF THE INVENTION

According to this invention, there is provided a spindle for an electrostatic painting machine comprising a stationary member, a main spindle mounted in the stationary member, a journal bearing portion for statically supporting the main spindle in a radial direction relative to the stationary member, a thrust bearing portion for statically supporting the main spindle in a thrust direction relative to the stationary member, a paint spray head mounted to one end of the main spindle for atomizing paint, and a current-carrying member having electrical conductivity retained relative to the stationary member and mounted opposite to the main spindle through a gap set to be smaller than gaps of the journal and thrust bearing portions.

With this arrangement, since discharge occurs concentratedly at the portion of the current-carrying member having a gap smaller than the gaps of the bearing portions, occurrence of sputtering at the bearing gaps of the externally pressurized gas bearing portions is prevented. Also, since the current-carrying member is not in contact with the main spindle, there will be no influence on the rotary performance of the main spindle, which is supported by the externally pressurized gas bearing portions.

The current-carrying member may be mounted on the stationary member so as to be movable toward and away from the main spindle, the current-carrying member being brought into contact with the main spindle with a predetermined biasing force, and the gap being formed by floating the current-carrying member off the main spindle by dynamic pressure produced by the rotation of the main spindle. With this arrangement, by setting the dynamic-pressure generating conditions, it is possible to easily form a small gap between the current-carrying member and the main spindle. Also, it is possible to maintain the gap constant. Further, by forming the gap small, it is possible to make the discharge energy small. Thus it is possible to suppress influence of sputtering at the gap portion.

Also, an adjusting means may be provided to adjust the biasing force from outside of the stationary member. A wedge-like space for producing dynamic pressure may be formed at the contact surface between the current-carrying member and the main spindle.

Further, the current-carrying member may be formed so as to be annular or arcuate, and it may be provided on the journal bearing portion. The current-carrying member may be formed rod-like and it may be provided on the thrust bearing portion. Further, the wedge-like space may be formed by initial wear during running-in of the main spindle. The current-carrying member may be formed of graphite.

According to the present invention, there is also provided a spindle for an electrostatic painting machine comprising a main spindle, a bearing sleeve mounted on the main spindle, a housing mounted on the bearing sleeve, and a paint spray head fixedly mounted to one end of the main spindle for atomizing paint, the bearing sleeve and the housing forming a bearing portion for rotatably supporting the main spindle by static pressure, the bearing sleeve being made of a brittle material having self-lubricity, the housing being made of a metallic material having corrosion resistance.

The bearing portion comprises a journal bearing portion for statically supporting the main spindle in a radial direction relative to the housing and a thrust bearing portion for statically supporting the main spindle in a thrust direction relative to the housing.

With this arrangement, by making the housing of a metallic material having corrosion resistance such as stainless steel and making the bearing sleeves of a brittle material having self-lubricity such as graphite, it is possible to provide a spindle suitable for an electrostatic painting machine which uses a water-soluble paint.

By setting the specific weight of the bearing sleeves to one third or less that of the housing and making the volume of the bearing sleeves larger than that of the housing, it is possible to reduce the weight of the entire housing assembly comprising the housing and the bearing sleeves.

It is preferable to form in the bearing sleeves air passages for compressed air supplied to the journal and thrust bearing portions because this reduces the volume of the housing.

This invention is applicable to a structure in which a turbine for driving is formed integrally on the main spindle. Also, it is preferable that the turbine defines the thrust bearing portion and is formed on the outer periphery of the rotor integrally formed on the main spindle. Also, this invention is suitable for an electrostatic painting machine which uses a water-soluble paint.

Other features and objects of the present invention will become apparent from the following description made with reference to the accompanying drawings, in which:

BRIEF DESCRIPTION OF THE DRAWINGS

FIG. 2A is a sectional view taken along line II—II of FIG. 1 when the main spindle is stopped;

FIG. 2B is a sectional view taken along line III—III of FIG. 1 while the main spindle is rotating;

FIG. 4A is a partial enlarged sectional view of the same when the main spindle is stopped;

FIG. 4B is a similar view while the main spindle is rotating;

FIG. 6A is a sectional view taken along line VI—VI of FIG. 5 when the main spindle is stopped;

FIG. 6B is a partial enlarged view of FIG. 6A;

FIG. 6C is a partial enlarged view of a modified example;

DETAILED DESCRIPTION OF THE PREFERRED EMBODIMENTS

Figure 1:
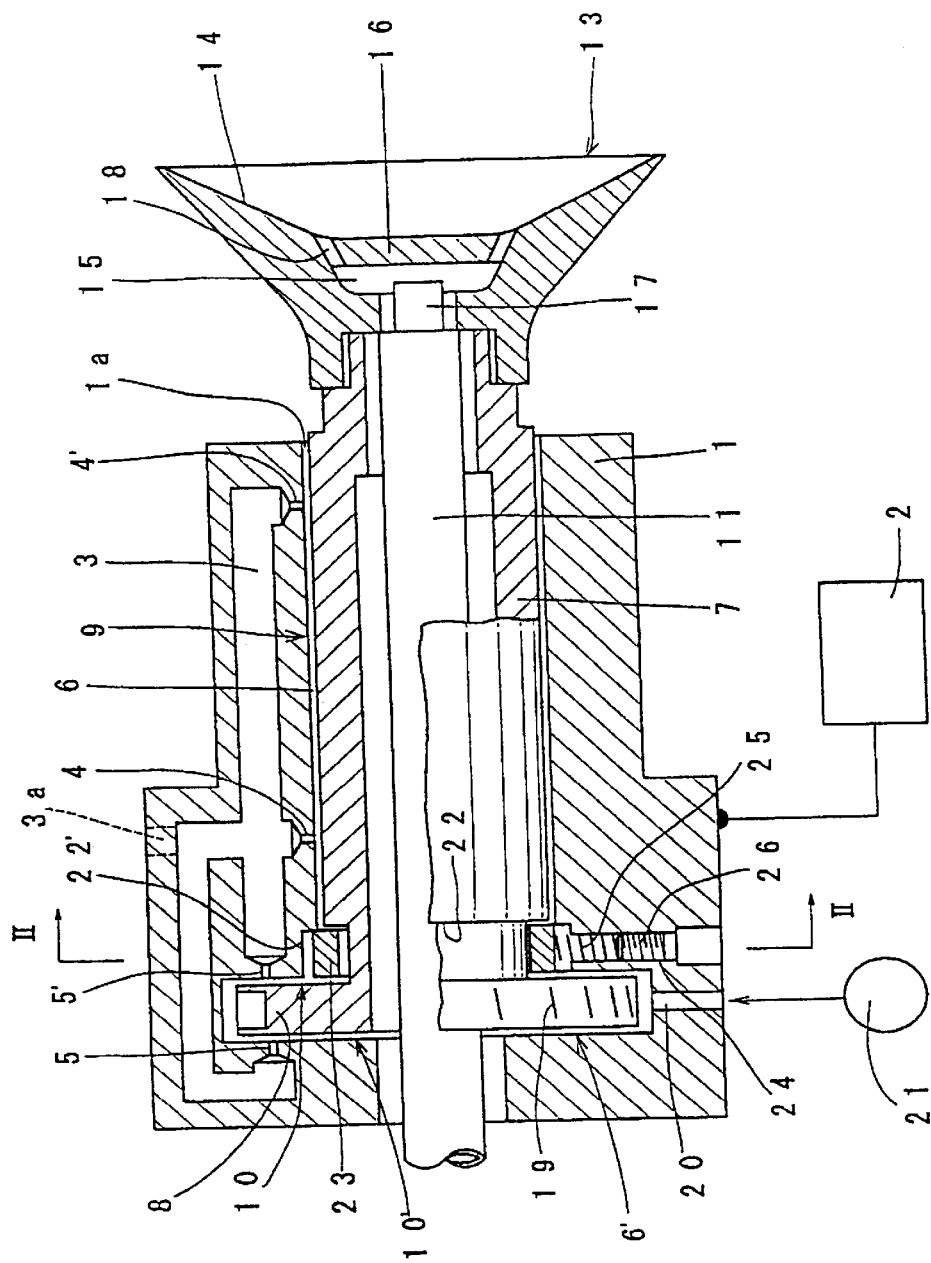
FIG. 1 is a sectional view of an electrostatic painting machine of a first embodiment.

Hereinbelow, the first embodiment of this invention is described with reference to FIGS. 1 and 2. As in the first example of the prior art, a high voltage generator 2 for generating a high negative voltage is electrically connected to a housing 1, an air passage 3 connected to a compressed air supply source (not shown) is formed therein, and a plurality of air supply nozzles 4, 4', 5, 5' coupled to the air passage 3 are formed in an internal hole 1a formed in the housing.

In the hole 1a in the housing 1, a hollow main spindle 7 and a rotor 8 of a turning force generator (e.g. turbine) provided at the rear end of the main spindle to rotate the main spindle 7 are inserted to form bearing gaps 6, 6'. Between the periphery of the main spindle 7 and the air supply nozzles 4, 4', a journal air bearing portion 9 is formed. Between the rotor 8 and the air supply nozzles 5, 5', thrust air bearing portions 10, 10' are formed. When compressed air is supplied from the air supply nozzles 4, 4', 5 and 5' into the bearing gaps 6, 6', under the pressure of the air, the main spindle 7 and the rotor 8 are supported in a floating state and kept out of contact with the housing 1. Now the externally pressurized gas bearing comprising the journal air bearing portion 9 and the thrust air bearing portions 10, 10' reveals its function.

The material for the main spindle 7 and the rotor 8 is not particularly limited, but stainless steel is preferable to prevent rust. Also, in order to prevent galling by contact with the bearing or to suppress seizure, hardening treatment such as hard chrome plating may be applied to their bearing surfaces.

At the front end of the main spindle 7, a paint spray head 13 for atomizing and spraying paint by the rotation of the main spindle 7 is fixed by suitable means such as screws. A conduit 11 having an injection nozzle 17 at its tip to feed paint to the spray head 13 is inserted from the rear of the main spindle 7 out of contact with the main spindle 7.

The paint blown from the injection nozzle 17 into a paint introducing space 15 defined by a partitioning wall 16 is introduced through a flow-out hole 18 to an inner peripheral surface 14 of the spray head 13 with high-speed rotation of the spray head 13, and scattered to the surroundings in a mist by centrifugal force. If the spray head 13 is negatively charged, the paint flowing along its inner peripheral surface 14 is electrostatically charged with a negative charge.

Around the rotor 8 at the rear end of the main spindle 7, a plurality of turbine blades 19 are arranged. In the housing 1, a compressed air blow-out nozzle 20 for blowing compressed air against the turbine blades 19 is formed. A compressor 21 is connected to this blow-out nozzle 20. When compressed air from the compressor 21 is blown against the turbine blades 19 through the blow-out nozzle 20, turning force is applied to the turbine blades 19. Thus the main spindle 7, which is supported in a floating state, is rotated at a high speed.

As a means for imparting a turning force to the main spindle 7, a structure using a motor may be employed.

In the outer peripheral surface of the main spindle 7 at its rotor-side end, an annular guide groove 22 is formed. In the inner peripheral surface of the housing 1, opposite to the guide groove 22, a guide groove 22' is formed. In a space defined by these guide grooves 22 and 22', an annular current-carrying member 23 made of graphite is mounted so as to be movable in a radial direction.

An adjusting hole 24 extending from the outer peripheral surface of the housing 1 to the internal hole 1a is provided. A spring 25 and an adjusting screw 26 are mounted in the adjusting hole 24 with the spring 25 pressed against the outer peripheral surface of the current-carrying member 23 to impart a biasing force in a radial direction to the current-carrying member 23. By the spring 25 and the adjusting screw 26, the current-carrying member 23 and the housing 1 are electrically connected.

While the main spindle 7 is stopped, as shown in FIG. 2A, the current-carrying member 23 is biased by the spring 25 into contact with the main spindle 7. Also, between the current-carrying member 23 and the main spindle 7, a wedge-like space 27 is formed.

In the electrostatic painting machine having such a structure, when the main spindle 7 rotates in the direction of the arrow shown in FIG. 2B, due to a dynamic-pressure effect in which air is drawn into the wedge-like space 27, pressure increases, so that the current-carrying member 23 will float via a gap 28 relative to the bottom surface of the guide groove 22 formed in the main spindle 7. The gap 28 is determined by the difference between the inner diameter of the current-carrying member 23 and the outer diameter of the main spindle 7 (at bottom of the guide groove 22), the biasing force and the number of revolutions of the main spindle 7.

The difference between the inner diameter of the current-carrying member 23 and the outer diameter of the main spindle 7 (at bottom of the guide groove 22) and the biasing force are set so that at the working number of revolutions, the gap 28 will be smaller than either of the bearing gaps of the journal air bearing portion 9 and the thrust air bearing portion 10. When the number of revolutions is constant, the amount of floating is constant.

By keeping the gap 28 smaller than the bearing gaps, discharge occurs at the gap 28 in a concentrated manner and thus it is possible to prevent sputtering at the journal air bearing portion 9 and the thrust air bearing portion 10. Since the gap 28 can be easily adjusted, by adjusting it to a fine gap, it is possible to reduce the energy during discharge, and thus to suppress the influence of sputtering.

Since the current-carrying member 23 is made of graphite, it is possible to reduce friction and wear of the main spindle 7 and the current-carrying member 23 at the beginning of rotation of the main spindle 7. In the above description, the current-carrying member 23 is provided at the end of the journal air bearing portion 9 on the side of the rotor 8 of the main spindle 7. But it may be provided at the opposite end or center of the journal bearing portion 9. If the guide groove 22 of the main spindle 7 is omitted and the outer diameter of the discharge portion is made flush with the bearing surface of the journal air bearing portion 9, it is possible to machine the outer surface of the main spindle 7 simultaneously with the machining of the bearing surface. Thus it is possible to reduce the number of working steps. Further, by forming the current-carrying member into a partially cut-out circle or an arc, it is possible to reduce its weight. Due to an increase in the characteristic frequency due to reduced weight, stability improves.

Figure 3:
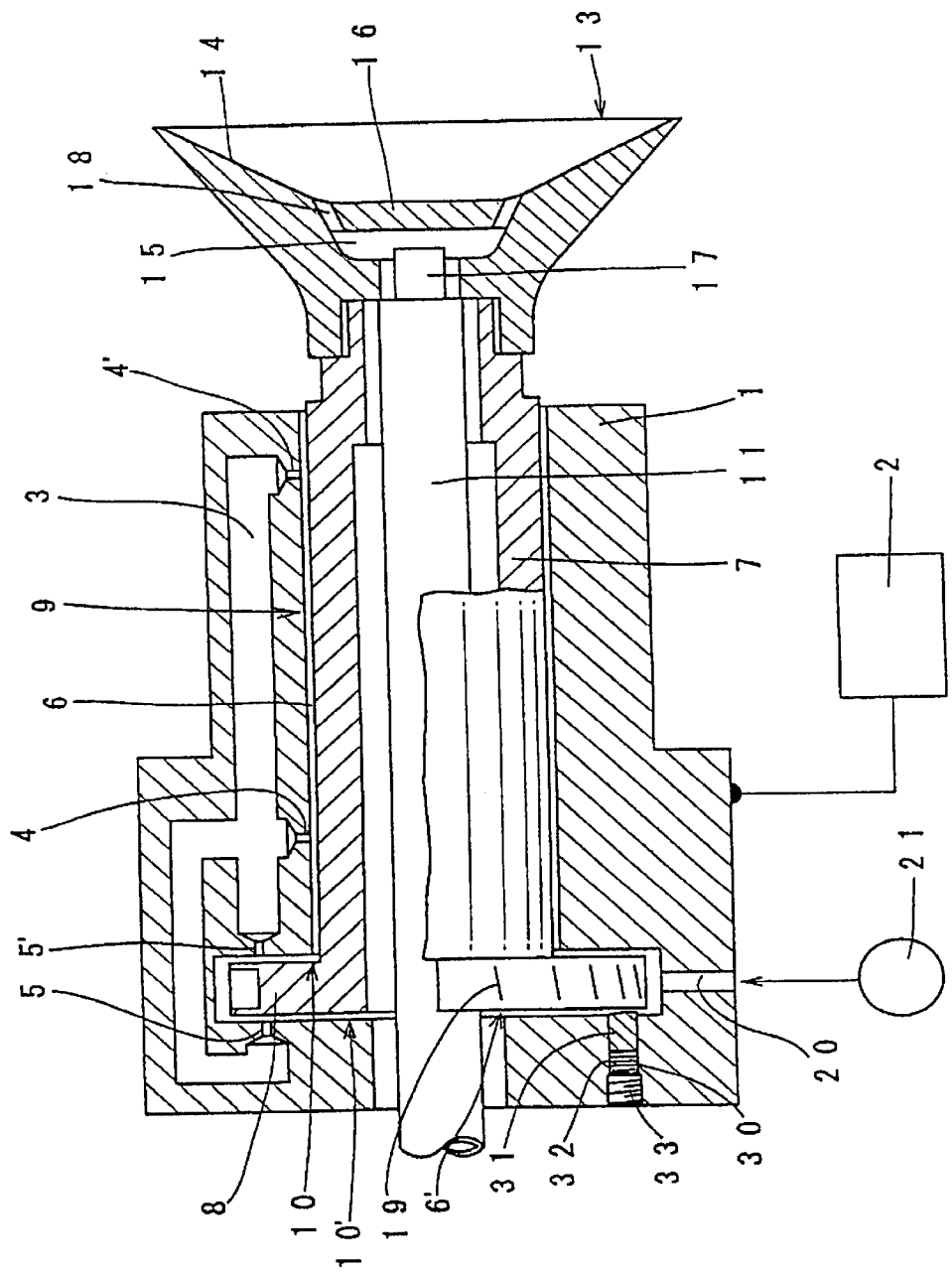
FIG. 3 is a sectional view of a second embodiment.

Next, the second embodiment will be described with reference to FIGS. 3 and 4. For the basic structure, it is the same as the first embodiment. Thus, only different portions are described below. In this embodiment, in a part of the housing 1 opposing the outer surface of the rotor 8, an axial adjusting hole 30 is provided. In the inner end thereof, a rod-like current-carrying member 31 made of graphite is mounted so as to be movable in the axial direction. Further, a spring 32 for imparting a biasing force to the current-carrying member 31 and an adjusting screw 33 operable from outside are mounted. The current-carrying member 31 and the housing 1 are electrically connected through the spring 32 and the adjusting screw 33.

As shown in FIGS. 4A and 4B, the rod-like current-carrying member 31 has its end face machined obliquely at a constant angle $\theta$ to form a wedge-like space 34 relative to the rotational direction (see arrow) of the main spindle 7.

While the main spindle 7 is stopped, as shown in FIG. 4A, the current-carrying member 31 is in contact with the outer surface of the rotor 8 of the main spindle 7. When it rotates in the direction of arrow shown in FIG. 4B, due to a dynamic-pressure effect in which air is drawn into the wedge-like space 34, pressure increases, so that the current-carrying member 31 floats via a gap 35 relative to the rotor 8. The gap 35 is determined by the angle $\theta$ of the end face of the current-carrying member 31 on the side of the main spindle, the area of the end face, biasing force and the number of revolutions of the main spindle 7.

The angle $\theta$ of the current-carrying member 31 on the side of the main spindle, the area of the end face and the biasing force are set so that at the working number of revolutions, the gap 35 will be smaller than either of the bearing gaps of the journal air bearing portion 9 and the thrust air bearing portion 10. When the number of revolutions of the main spindle 7 is constant, the amount of floating is constant.

As described above, by reducing the gap 35 smaller than the bearing gaps of the respective air bearing portions 9 and 10, as in the first embodiment, discharge will occur concentratedly in the gap 35 and thus it is possible to prevent sputtering at the respective air bearing portions 9 and 10. Since the gap 35 can be easily adjusted, by adjusting it to a fine gap, it is possible to reduce the energy during discharge and thus to suppress the influence of sputtering at this portion.

The current-carrying member 31 may be provided on the inner surface side of the rotor 8. Also, instead of machining the end face of the current-carrying member 31 to an inclined surface having an angle $\theta$, a member having a flat end face may be used and its corner portion may be preferentially worn by running-in under suitable conditions to form an inclined angle, thereby forming the wedge-like space 34. By this arrangement, it is possible to reduce the number of working steps for the current-carrying member 31.

In either of the first and second embodiments, as a means for passing electricity between the current-carrying member 23, 31 and the housing 1, the spring 25, 32 as a biasing means and the screw 26, 33 are used. But other means may be used. For example, electricity may be passed by using a conductor wire. The adjusting screw 26, 33 for the biasing means may be omitted. Further, instead of the spring 25, 32, a resilient member such as rubber may be used. Also, the current-carrying member 23, 31 may be made of not graphite but a metal having a conductive solid lubricating film on its surface opposing the main spindle 7 or a conductive fluororesin.

Figure 5:
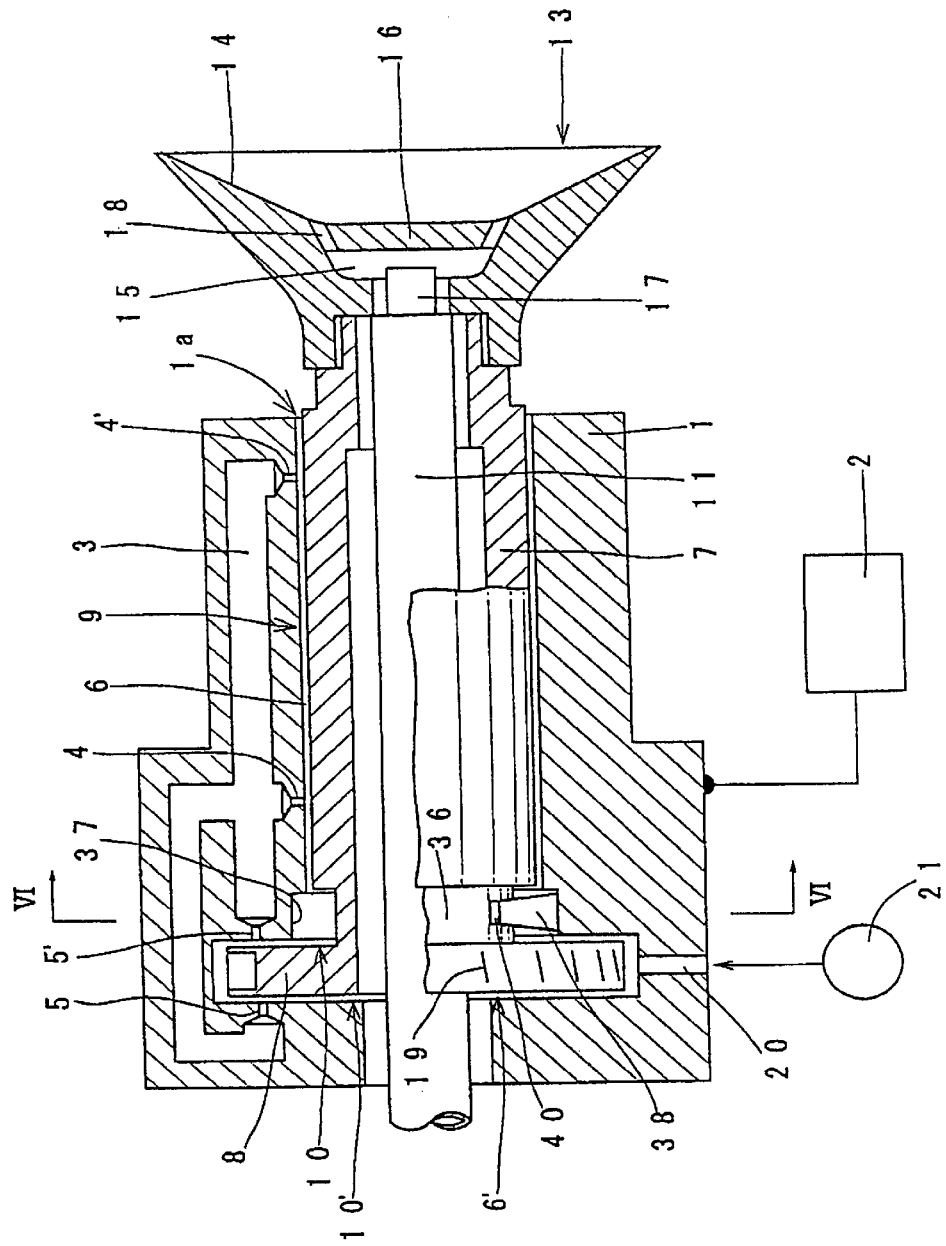
FIG. 5 is a sectional view of a third embodiment.
Figure 7A:
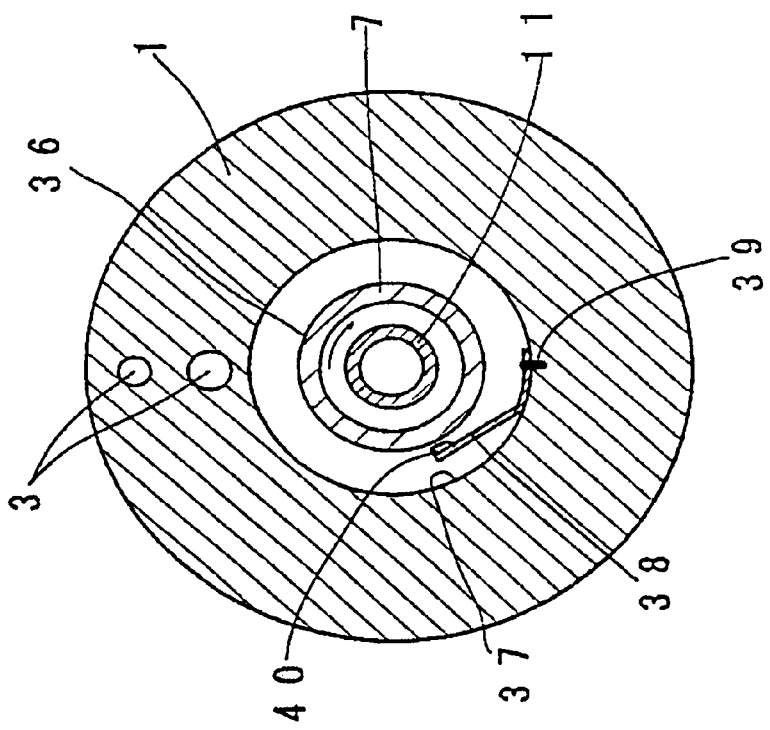
FIG. 7A is a sectional view taken along line VI—VI of FIG. 5 while the main spindle is rotating.

Next, the third embodiment will be described with reference to FIGS. 5–7. For the basic structure, it is the same as the first and second embodiments. Thus, description will be made of different portions only. At the end of the main spindle 7 on the side of the rotor 8, an annular groove 36 is formed in the outer periphery of the main spindle 7. A groove 37 is formed in the inner periphery of the housing 1, opposite the groove 36. A constant space is formed between both grooves 36 and 37. A leaf spring 38 has one end thereof mounted to the groove 37 by a screw 39 (FIG. 6A). A current-carrying member 40 is mounted to the tip of the leaf spring 38, which extends in a tangential direction relative to the groove 36 (FIGS. 6B, 6C).

The leaf spring 38 is formed of a conductive material suitable for springs. The current-carrying member is made of graphite or a conductive material as described above. The current-carrying member 40 is integrated with the leaf spring 38 as by bonding to ensure conductivity of the housing 1 and the current-carrying member 40. The leaf spring 38 serves to radially bias the current-carrying member 40 against the main spindle 7.

Between the current-carrying member 40 and the bottom of the groove 36 formed in the outer periphery of the main spindle 7, as shown in FIGS. 6B and 6C, a wedge-like space 41 is formed. As shown in FIG. 6B, the wedge-like space 41 is formed by obliquely machining the surface of the current-carrying member 40 on the side of the main spindle 7. But as shown in FIG. 6C, the wedge-like space 41 may be formed by the tangential angle defined between a flat surface on the current-carrying member and the main spindle 7.

Figure 7B:
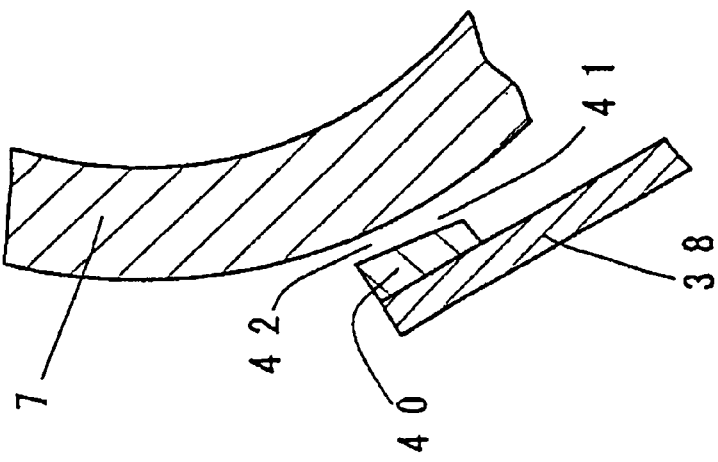
FIG. 7B is a partial enlarged view of FIG. 7A.

While the main spindle 7 is stopped, as shown in FIGS. 6A–6C, the current-carrying member 40 is in contact with the main spindle 7. When it rotates in the direction of an arrow shown in FIG. 7A, due to a dynamic-pressure effect in which air is drawn into the wedge-like space 41, pressure increases, so that the current-carrying member 40 floats via a gap 42 relative to the main spindle 7 (FIG. 7B). The gap 42 is determined by the angle θ of the wedge-like space, area of the current-carrying member 40, biasing force and the number of revolutions of the main spindle 7. The end face angle and area of the current-carrying member 40 and the biasing force are set so that at the working number of revolutions, the gap 42 will be smaller than either of the bearing gaps of the journal air bearing portion 9 and the thrust air bearing portion 10.

The current-carrying element comprising the leaf spring 38 and the current-carrying member 40 is provided in only one set in the embodiment. But they may be provided in a plurality of sets and arranged on the circumference, or may be provided at different locations on the main spindle 7, or it may be provided on the rotor 8.

As described above, by reducing the gap 42 smaller than the bearing gaps of the respective bearing portions 9, 10, discharge occurs concentratedly in the gap 42 and thus it is possible to prevent sputtering at the air bearing portions 9 and 10 as in the above-described embodiments. Since the gap 42 can be easily adjusted, by adjusting it to a fine gap, it is possible to reduce the energy during discharge and thus to suppress the influence of sputtering at this portion.

Figure 8:
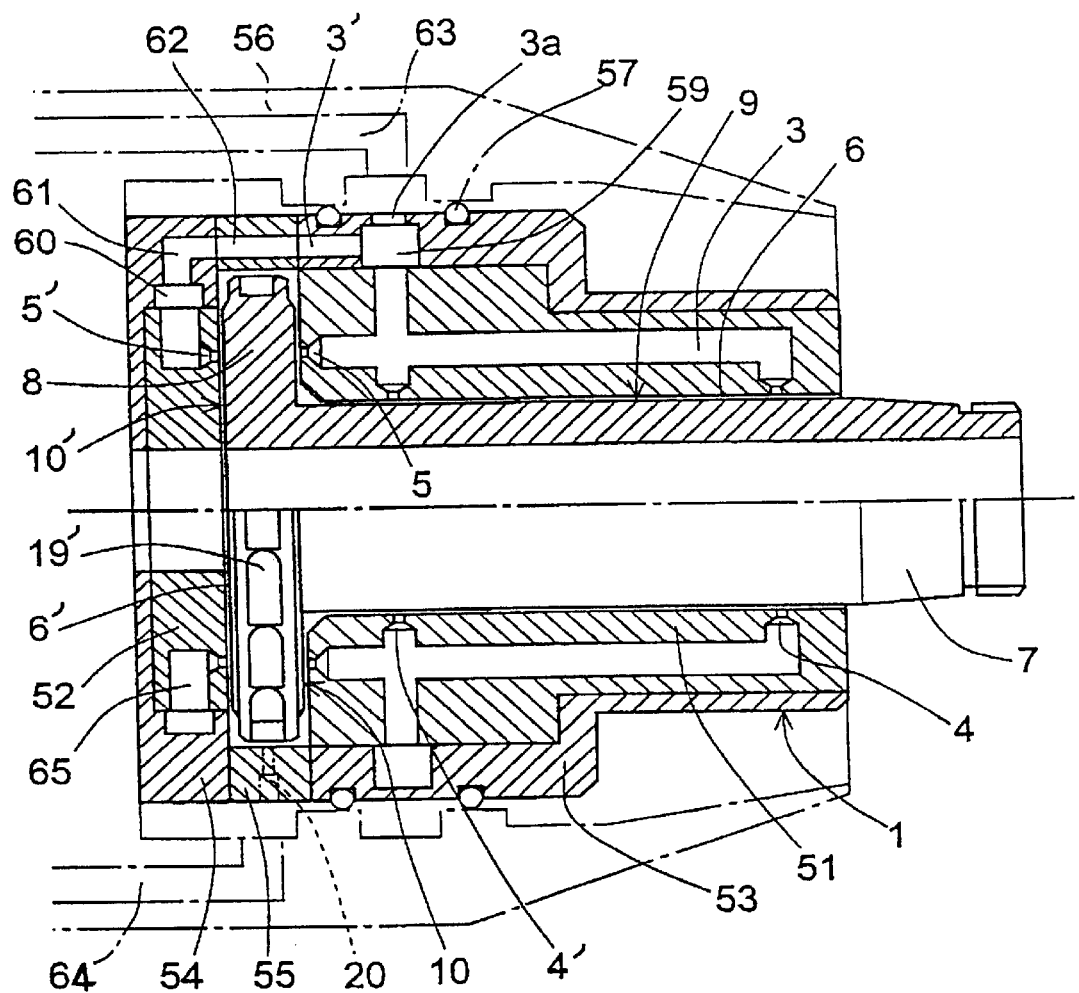
FIG. 8 is a sectional view of a fourth embodiment.
Figure 9:
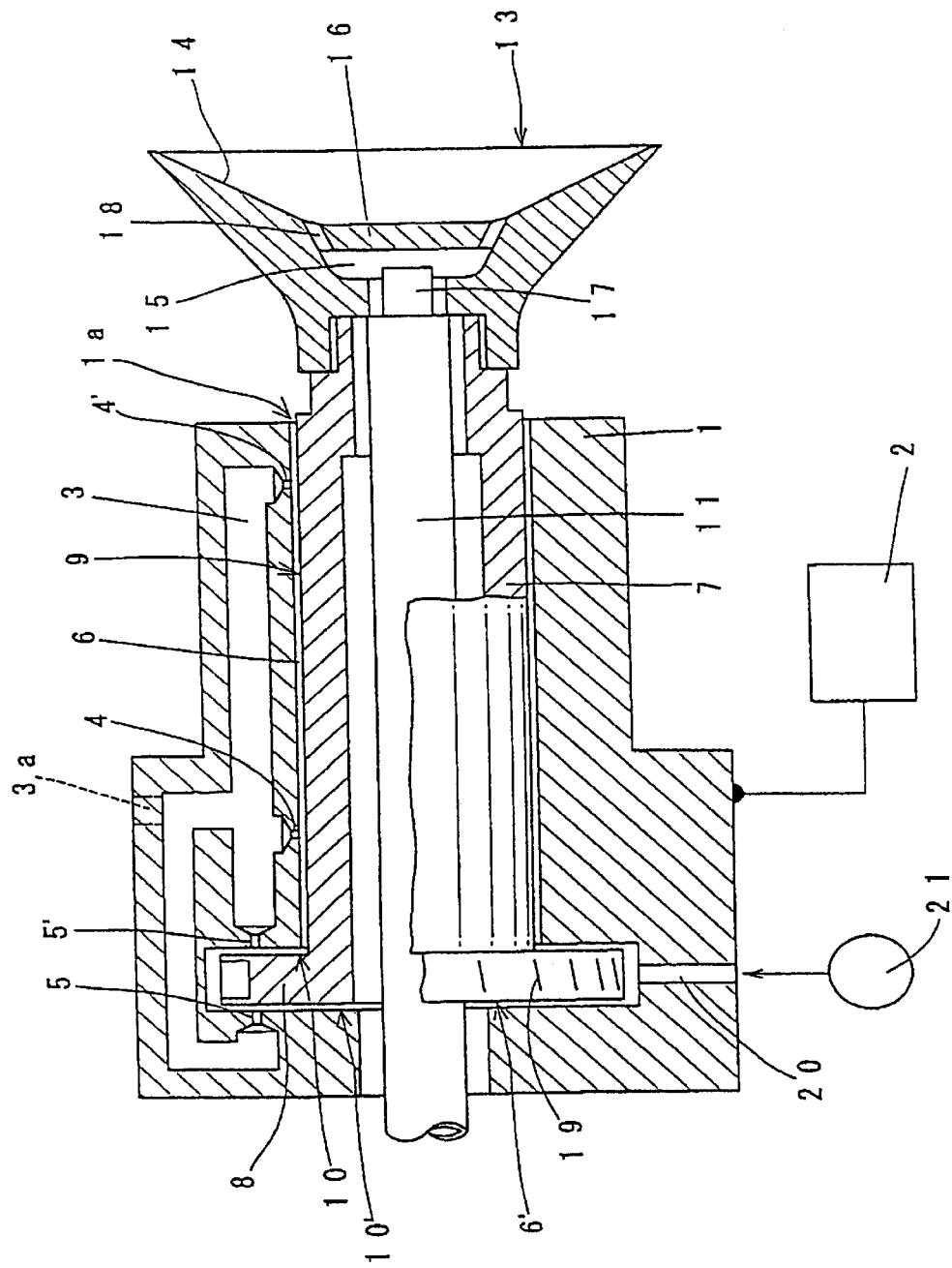
FIG. 9 is a sectional view of a conventional spindle.

FIG. 8 shows a fourth embodiment in which an air turbine is used as a driving means. The spindle has a driving turbine formed by providing a plurality of recesses 19' on the outer periphery of the rotor 8 of the main spindle 7. The main spindle is rotated by blowing compressed air from blow-out nozzles 20 against portions opposite the recesses 19'. While not shown, an atomizing head for atomizing paint is mounted to one end of the main spindle 7.

The main spindle 7 and the rotor 8 integrally provided on the main spindle are rotatably supported in a non-contact manner relative to bearing sleeves 51, 52 and first and second housings 53, 54 by a journal bearing portion 9 and thrust bearing portions 10, 10' formed on the bearing sleeves 51, 52 and first and second housings 53, 54.

The journal bearing portion 9 and the thrust bearing portion 10 are formed by fitting the bearing sleeve 51 into the substantially cylindrical first housing 53 by suitable means such as shrinkage fit, press fit or bonding. Similarly, the thrust bearing portion 10' is formed by fitting the bearing sleeve 52 into the circular, lid-like second housing 54 by suitable means such as shrinkage fit, press fit or bonding.

Between the first and second housings 53, 54, a ring-like third housing 55 is disposed. The housings 53, 54 and 55 are integrally assembled together by fastening means such as bolts to form the housing 1. The housing 1 is housed in a painting machine case 56 (stationary member) made of a resin through a resilient member 57 such as an O-ring. The housing 1 is made of stainless steel as a metallic material having corrosion resistance.

With this arrangement, even if a water-soluble paint is used for electrostatic painting, it is possible to prevent the housings from being corroded by the water-soluble paint. Also, deformation of the housings by chucking during machining is so small that high-precision machining of the bearing surfaces can be easily realized.

The bearing sleeves 51, 52 are formed of graphite, which has a specific weight of one third or less of that of the stainless steel forming the housings and is a brittle material having good self-lubricity. They are formed with a plurality of fine journal bearing nozzles 4, 4' and thrust bearing nozzles 5, 5'.

Since the bearing sleeves 51, 52 are formed of graphite, in electrostatic painting in which is used a water-soluble paint having high viscosity, for achieving high-speed rotation of the spindle and improving painting performance, it is possible to improve durability of the air bearings. Since the first and second housings 53, 54 into which are fitted bearing sleeves 51, 52 made of graphite, are formed of stainless steel, anode corrosion will not occur at the joint surfaces.

Figure 10:
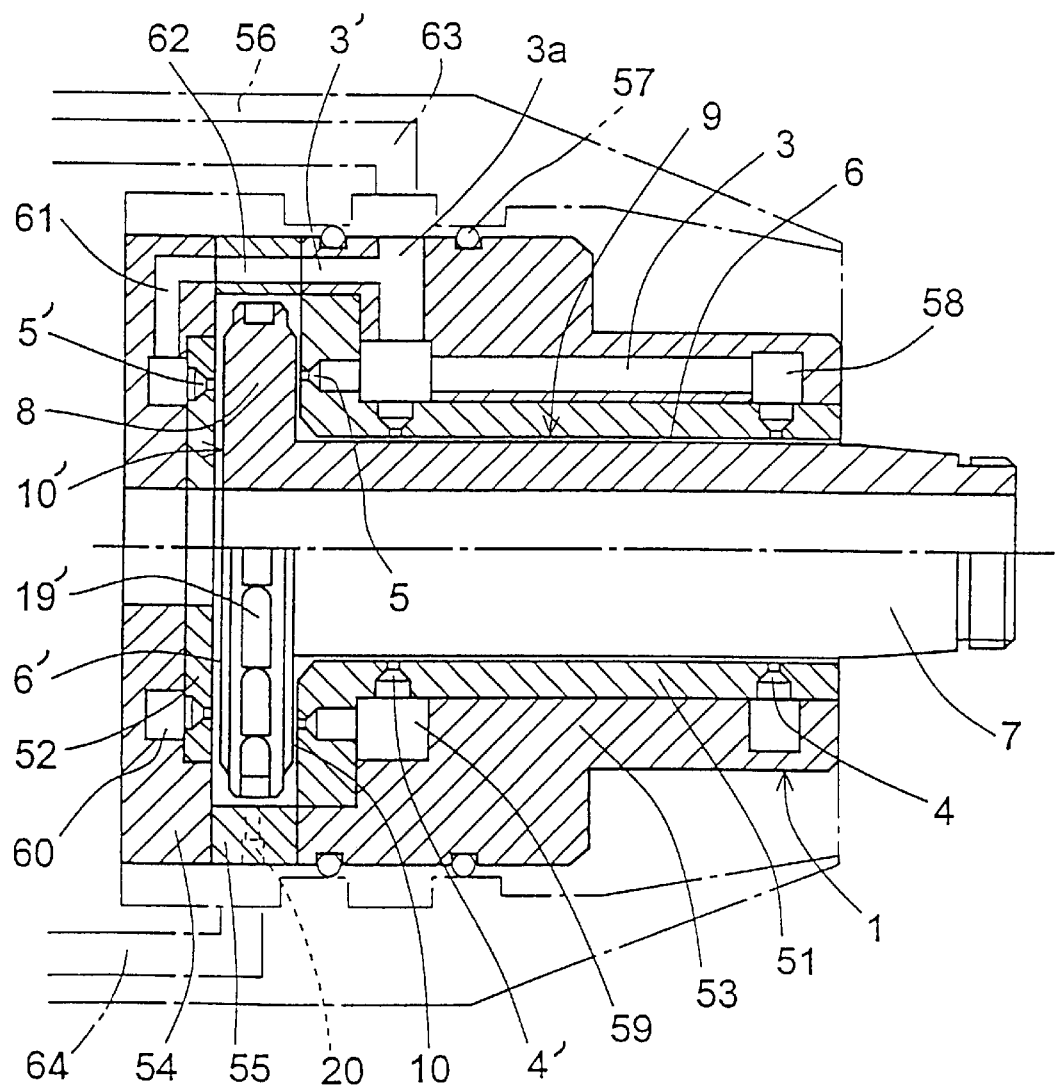
FIG. 10 is a sectional view of another conventional spindle.

In this embodiment, air passages 3 and 65 are formed in the bearing sleeves 51, 52. This makes it possible make the wall thicknesses of the housings 53 and 54 thin compared to the bearing sleeves 51, 52. Also, the annular groove 58 used in the second example of the prior art spindle (shown in FIG. 10) is omitted and the air passage 61 is shortened. Thus it is possible to reduce the weight of the entire housing assembly comprising the housing 1 and the bearing sleeves 51, 52.

The bearing sleeve 51, 52 are formed with air passages 3, 65, which communicate with the air supply nozzles 4, 4' and air supply nozzles 5, 5', respectively. Also, circumferential grooves 59, 60 communicating with the air passages 3, 65 are formed in the first and second housings 53, 54, respectively. An air supply port 3a communicating with the circumferential groove 59 is formed in the first housing 53. Further, an air passage 63 communicating with the air supply port 3a is provided in the painting machine case 56. Also, the third housing 55 is formed with a plurality of blow-out nozzles 20 opening substantially in a tangential direction along the inner periphery at portions opposing the recesses 19' of the rotor 8 so as to extend therethrough.

In this embodiment, the housing 1 is formed of stainless steel having a specific weight of e.g. about 7.8, the bearing sleeves 51, 52 are formed of graphite having a specific weight of about 2.0, and the volume ratio of the bearing sleeves 51, 52 to the housing 1 is not less than 1. With this structure, it is possible to make the weight equivalent to that in the case in which the volume ratio of the housing to the bearing sleeves is 1 or over.

Compressed air supplied through the air passage 63 of the painting machine case 56 is supplied from the air supply port 3a of the first housing 53, through the circumferential groove 59 into the air passage 3 of the bearing sleeve 51, and is blown from the air supply nozzles 4 of the journal bearing portion 9 to radially support the main spindle 7 with the journal bearing portion 9.

Also, compressed air supplied into the air passage 65 of the bearing sleeve 52 is blown against the bearing surface of the thrust bearing portions 10, 10' through the thrust bearing nozzles 5, 5'. Further, compressed air is also supplied from air passages 3', 62, 61 of the first, third and second housings 53, 55, 54, through the circumferential groove 60 into the air passage 65 of the bearing sleeve 52, and blown against the bearing surface of the thrust bearing 10, 10' through the thrust bearing nozzles 5, 5'. In this way, the main spindle 7 is axially supported by the thrust bearing portions 10, 10'.

On the other hand, compressed air supplied from the air passage 64 of the painting machine case 56 is blown from the blow-out nozzles 20 of the third housing 55 substantially in a tangential direction toward the recesses 19' of the rotor 8 of the main spindle 7. The compressed air thus blown imparts a turning force to the main spindle 7 and is exhausted outside the spindle through an exhaust port (not shown). An atomizing head (not shown) for atomizing paint is mounted to one end (right end in the figures) of the main spindle 7 and electrostatic painting is carried out.

According to this invention, because the gap of the current-carrying member relative to the main spindle is set smaller than the bearing gaps of the externally pressurized gas bearing portions, discharge occurs concentratedly at the gap and thus it is possible to prevent sputtering at the externally pressurized gas bearing portions. Thus, it is possible to prolong the life of the spindle.

Also, by floating the current-carrying member by dynamic-pressure effect accompanying the rotation of the main spindle, it is possible to easily form a fine gap narrower than the bearing gaps of the externally pressurized gas bearing portions. Also, it is possible to keep the gap constant. Further, by forming the gap of the current-carrying member small, the energy of discharge is small. Thus it is possible to suppress the influence of sputtering at the gap portion.

Further, according to the present invention, by making the housing of a metallic material having corrosion resistance such as stainless steel and making the bearing sleeves of a brittle material having self-lubricity such as graphite, it is possible to provide a spindle which is suitable for an electrostatic painting machine using a water-soluble paint, is light-weight and has excellent corrosion resistance and bearing endurance during high speed rotation.

What is claimed is:

1. A spindle arrangement for an electrostatic painting machine, comprising: a housing; a main spindle mounted in said housing; a journal bearing portion for statically supporting said main spindle in a radial direction relative to said housing; a thrust bearing portion for statically supporting said main spindle in a thrust direction relative to said housing; a paint spray head mounted to one end of said main spindle for atomizing paint; and a current-carrying member mounted to said housing with electric conductivity retained and opposite to said main spindle through a gap set to be smaller than gaps of said journal and thrust bearing portions, wherein said current-carrying member is mounted on said housing so as to be movable toward and away from said main spindle, said current-carrying member being brought into contact with said main spindle with a predetermined biasing force when said main spindle is stopped, and said gap being formed by floating said current-carrying member off said main spindle against the biasing force by dynamic pressure produced by rotation of said main spindle; and wherein an adjusting means for adjusting said biasing force from outside of said housing is provided.

2. The spindle arrangement as claimed in claim 1, wherein said current-carrying member is formed so as to be annular or arcuate, and said current-carrying member is provided on said journal bearing portion.

3. The spindle arrangement as claimed in claim 1, wherein said current-carrying member comprises a rod, and said current-carrying member is provided on said thrust bearing portion.

4. The spindle arrangement as claimed in claim 1, wherein said current-carrying member is formed of graphite.

5. A spindle arrangement for an electrostatic painting machine, comprising: a housing; a main spindle mounted in said housing; a journal bearing portion for statically supporting said main spindle in a radial direction relative to said housing; a thrust bearing portion for statically supporting said main spindle in a thrust direction relative to said housing; a paint spray head mounted to one end of said main spindle for atomizing paint; and a current-carrying member mounted to said housing with electric conductivity retained and opposite to said main spindle through a gap set to be smaller than gaps of said journal and thrust bearing portions, wherein said current-carrying member is mounted on said housing so as to be movable toward and away from said main spindle, said current-carrying member being brought into contact with said main spindle with a predetermined biasing force when said main spindle is stopped, and said gap being formed by floating said current-carrying member off said main spindle against the biasing force by dynamic pressure produced by rotation of said main spindle; and wherein a wedge-shaped space for producing dynamic pressure is formed at a contact surface between said current-carrying member and said main spindle.

6. The spindle arrangement as claimed in claim 5, wherein said current-carrying member is constructed such that wedge-shaped space is formed by initial wear during running-in of said main spindle.

7. The spindle arrangement as claimed in claim 5, wherein an adjusting means for adjusting said biasing force from outside of said housing is provided.

8. The spindle arrangement as claimed in claim 5, wherein said current-carrying member is formed so as to be annular or arcuate, and said current-carrying member is provided on said journal bearing portion.

9. The spindle arrangement as claimed in claim 5, wherein said current-carrying member comprises a rod, and said current-carrying member is provided on said thrust bearing portion.

10. The spindle arrangement as claimed in claim 5, wherein said current-carrying member is formed of graphite.

11. A spindle arrangement for an electrostatic painting machine, comprising a main spindle, a bearing sleeve mounted on said main spindle, a housing mounted on said bearing sleeve, and a paint spray head fixedly mounted to one end of said main spindle for atomizing paint, said bearing sleeve and said housing forming a bearing portion for rotatably supporting said main spindle by static pressure, said bearing sleeve being made of a brittle material having self-lubricity, said housing being made of a metallic material having corrosion resistance, wherein said bearing portion comprises a journal bearing portion for statically supporting said main spindle in a radial direction relative to said housing and a thrust bearing portion for statically supporting said main spindle in a thrust direction relative to said housing, and wherein the specific weight of said bearing sleeve is one third or less of that of said housing and the volume of said bearing sleeve is larger than that of said housing.

12. The spindle arrangement as claimed in claim 11, wherein said brittle material is graphite.

13. The spindle arrangement as claimed in claim 11, wherein said metallic material is stainless steel.

14. The spindle arrangement as claimed in claim 11, wherein said bearing sleeve is formed with an air passage through which compressed air is supplied to said journal bearing portion and said thrust bearing portion.

15. The spindle arrangement as claimed in claim 11, wherein said main spindle is provided with an integrally formed turbine portion for driving said main spindle.

16. The spindle arrangement as claimed in claim 15, wherein said main spindle has a rotor integrally provided thereon and said turbine portion forms said bearing portion and is formed on the outer periphery of said rotor.

17. The spindle arrangement as claimed in claim 11, wherein said housing is elastically supported on a stationary member made of a synthetic resin through an elastic member.

18. The spindle arrangement as claimed in claim 11, wherein a water-soluble paint is used for the electrostatic painting machine.

19. A spindle arrangement for an electrostatic painting machine, comprising:

a housing;

a main spindle mounted in said housing;

a journal bearing portion for statically supporting said main spindle in a radial direction relative to said housing with a radial bearing gap between said main spindle and said housing;

a thrust bearing portion for statically supporting said main spindle in a thrust direction relative to said housing with a thrust bearing gap between said main spindle and said housing;

a paint spray head mounted to one end of said main spindle for atomizing paint;

a current-carrying member mounted to said housing for conducting electricity from said housing to said main spindle; and a biasing member arranged to bias said current-carrying member toward a first position in which said current-carrying member contacts said spindle;

wherein said biasing member and said current-carrying member are arranged such that, upon rotation of said main spindle, a dynamic pressure force is created to push said current-carrying member against a biasing force of said biasing member away from said main spindle to a second position in which a conductive gap is formed between said current-carrying member and said main spindle, said conductive gap being smaller than said radial bearing gap and said thrust bearing gap and allowing electrical conduction from said current-carrying member to said main spindle.

20. The spindle arrangement as claimed in claim 19, further comprising an adjusting mechanism arranged to adjust the biasing force of said biasing member.

21. The spindle arrangement as claimed in claim 20, wherein said adjusting mechanism is arranged so as to be accessible from outside said housing.

22. The spindle arrangement as claimed in claim 19, wherein said current-carrying member and said main spindle are arranged such that, when said current-carrying member is in said first position, a wedge-shaped space is formed between said current-carrying member and said main spindle so as to create said dynamic pressure upon rotation of said main spindle.

23. The spindle arrangement as claimed in claim 22, wherein said current-carrying member is constructed such that said wedge-shaped space is formed by initial wear during running-in of said main spindle.

24. The spindle arrangement as claimed in claim 19, wherein said current-carrying member is formed so as to be annular or arcuate, and said current-carrying member is provided on said journal bearing portion.

25. The spindle arrangement as claimed in claim 19, wherein said current-carrying member comprises a rod, and said current-carrying member is provided on said thrust bearing portion.

26. The spindle arrangement as claimed in claim 19, wherein said current-carrying member is formed of graphite.

* * * * *